US012407104B2

(12) United States Patent
Liao et al.

(10) Patent No.: US 12,407,104 B2
(45) Date of Patent: Sep. 2, 2025

(54) DEVICE AND METHOD FOR DETECTION

(71) Applicant: Wistron Corp., New Taipei (TW)

(72) Inventors: Cheng Nung Liao, New Taipei (TW); Yin Yu Chen, New Taipei (TW); Yao Tsung Chang, New Taipei (TW)

(73) Assignee: WISTRON CORP., New Taipei (TW)

( * ) Notice: Subject to any disclaimer, the term of this patent is extended or adjusted under 35 U.S.C. 154(b) by 288 days.

(21) Appl. No.: 18/337,161

(22) Filed: Jun. 19, 2023

(65) Prior Publication Data

US 2024/0364010 A1 Oct. 31, 2024

(30) Foreign Application Priority Data

Apr. 25, 2023 (TW) ................................ 112115235

(51) Int. Cl.
*H01Q 9/04* (2006.01)
*H01Q 15/16* (2006.01)

(52) U.S. Cl.
CPC ........... *H01Q 9/0407* (2013.01); *H01Q 15/16* (2013.01)

(58) Field of Classification Search
CPC ..... H01Q 21/065; H01Q 15/16; H01Q 9/0407
See application file for complete search history.

(56) References Cited

U.S. PATENT DOCUMENTS

2021/0184340 A1* 6/2021 Stav ...................... G01S 13/931

FOREIGN PATENT DOCUMENTS

CN 216698717 U 6/2022

OTHER PUBLICATIONS

Noor Hafizah, A.A., et al.; "RCS Analysis on Different Targets and Bistatic Angles Using LTE Frequency;" Jun. 2015; pp. 1-6.
Chinese language office action dated Apr. 3, 2024, issued in application No. TW 112115235.

* cited by examiner

*Primary Examiner* — Monica C King
(74) *Attorney, Agent, or Firm* — McClure, Qualey & Rodack, LLP

(57) ABSTRACT

A detection device and a detection method are provided in the invention. The detection device includes a dielectric substrate, a reception antenna, a transmission antenna, and a reflector. The dielectric substrate includes a ground element. The dielectric substrate has a first surface and a second surface which are opposite to each other. The reception antenna is disposed on the first surface of the dielectric substrate. The transmission antenna is disposed on the second surface of the dielectric substrate. The reflector is adjacent to the reception antenna.

20 Claims, 6 Drawing Sheets

DEVICE AND METHOD FOR DETECTION

CROSS REFERENCE TO RELATED APPLICATIONS

This application claims priority of Taiwan Patent Application No. 112115235 filed on Apr. 25, 2023, the entirety of which is incorporated by reference herein.

BACKGROUND OF THE INVENTION

Field of the Invention

The invention relates to a detection device and a detection method, and more particularly, to a detection device and a detection method used for a radar antenna.

Description of the Related Art

In the medical field, a radar device may be used to continuously monitor the state of a patient and maintain their personal safety. However, conventional radar devices usually have insufficient radar FOV (Field of View), excessive surrounding interference, and low isolation between antennas. Accordingly, there is a need to propose a novel solution for solving the problems of the prior art.

BRIEF SUMMARY OF THE INVENTION

An exemplary embodiment of the invention provides a detection device that includes a dielectric substrate, a reception antenna, a transmission antenna, and a reflector. The dielectric substrate includes a ground element. The dielectric substrate has a first surface and a second surface which are opposite to each other. The reception antenna is disposed on the first surface of the dielectric substrate. The transmission antenna is disposed on the second surface of the dielectric substrate. The reflector is adjacent to the reception antenna.

An exemplary embodiment of the invention provides a detection method that includes the following steps. The method includes providing a detection device. The detection device includes a dielectric substrate, a reception antenna, a transmission antenna, and a reflector. The dielectric substrate includes a ground element and has a first surface and a second surface. The first surface is opposite the second surface. The reception antenna is disposed on the first surface of the dielectric substrate. The transmission antenna is disposed on the second surface of the dielectric substrate. The reflector is adjacent to the reception antenna. The method includes using the detection device to detect an object under test.

To make the aforementioned more comprehensible, several embodiments accompanied with drawings are described in detail as follows.

BRIEF DESCRIPTION OF DRAWINGS

The invention may be more fully understood by reading the subsequent detailed description and examples with references made to the accompanying drawings, wherein.

DETAILED DESCRIPTION OF THE INVENTION

Figure 1:
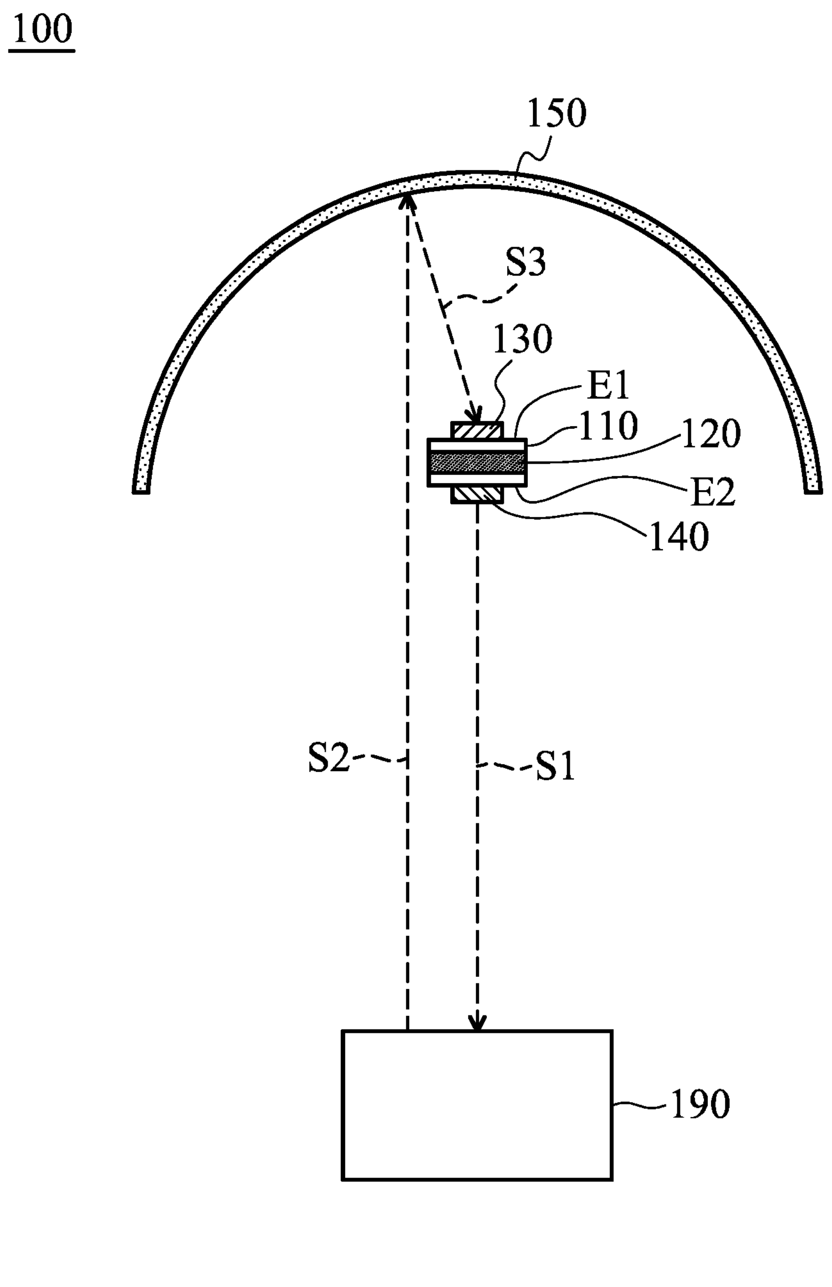
FIG. 1 is a diagram of a detection device according to an embodiment of the invention.

In order to illustrate the foregoing and other purposes, features and advantages of the invention, the embodiments and figures of the invention will be described in detail as follows.

This document does not intend to distinguish between components that differ in name but not function. In the following description and in the claims, the terms "include" and "comprise" are used in an open-ended fashion, and thus should be interpreted to mean "include, but not limited to . . . ". The term "substantially" means the value is within an acceptable error range. One skilled in the art may solve the technical problem within a predetermined error range and achieve the proposed technical performance. Also, the term "couple" is intended to mean either an indirect or direct electrical connection. Accordingly, if one device is coupled to another device, that connection may be through a direct electrical connection, or through an indirect electrical connection via other devices and connections.

The formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "below" and "above" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

FIG. 1 is a diagram of a detection device 100 according to an embodiment of the invention. For example, the detection device 100 may be applied to a radar device, but it is not limited thereto. In the embodiment of FIG. 1, the detection device 100 includes a dielectric substrate 110, a reception antenna 130, a transmission antenna 140, and a reflector 150. It should be understood that the detection device 100 may further include other components, such as a processor and/or a power supply module, although they are not displayed in FIG. 1. The power supply module is coupled to the processor, and is configured to provide electric power for the processor and/or the detection device 100.

The detection device 100 is configured to detect an adjacent object 190 under test. For example, the object 190 may be a human body, but it is not limited thereto. In some embodiments, the object 190 is any conductor, any nonconductor, or any human portion. It should be noted that the object 190 is not any portion of the detection device 100.

The dielectric substrate 110 may be an FR4 (Flame Retardant 4) substrate, a PCB (Printed Circuit Board), or an FPC (Flexible Printed Circuit). It should be noted that when the operational frequency is higher than about 20 GHz, the use of FR4 substrate may degrade the performance. Thus, when it is generally applied to a higher operational frequency band, such as 24 GHz, 28 GHz, or 60 GHz, the PCB of the high-frequency substrates may be used in order to maintain the performance. In addition, the entire PCB is not limited to a single substrate material. For example, the PCB used may be a four-layer board with the outermost two dielectric layers as high-frequency materials. Then, the FR4 substrate is used as a middle layer combined with upper and lower layers. The dielectric substrate 110 includes a ground element 120. The ground element 120 may be made of a metal material. In some embodiments, the ground element 120 is implemented with a metal plane, which may be embedded in the dielectric substrate 110.

The dielectric substrate 110 has a first surface E1 and a second surface E2 which are opposite to each other. The reception antenna 130 is disposed on the first surface E1 of the dielectric substrate 110. The transmission antenna 140 is disposed on the second surface E2 of the dielectric substrate 110. In other words, the ground element 120 of the dielectric substrate 110 may be disposed between the reception antenna 130 and the transmission antenna 140. According to practical measurements, such a design may help to significantly increase the isolation between the reception antenna 130 and the transmission antenna 140.

The shapes and types of the reception antenna 130 and the transmission antenna 140 are not limited in the invention. In some embodiments, any of the reception antenna 130 and the transmission antenna 140 is a patch antenna, a monopole antenna, a dipole antenna, a loop antenna, a PIFA (Planar Inverted F Antenna), or a chip antenna, but it is no limited thereto.

In some embodiments, both the reception antenna 130 and the transmission antenna 140 of the detection device 100 may cover an operational frequency band from 5 GHz to 78 GHz, so as to support the wideband operations of radar or mmWave (Millimeter Wave). It should be noted that the aforementioned operational frequency band is merely exemplary, which is adjustable according to different requirements.

The reflector 150 is adjacent to the reception antenna 130. In some embodiments, the reflector 150 is a parabolic dish reflector, whose opening is arranged toward the reception antenna 130. Also, the reception antenna 130 may be substantially disposed at the focal point of the parabolic dish reflector. It should be noted that the term "adjacent" or "close" in the disclosure means that the distance (space) between two corresponding elements is smaller than a predetermined distance (e.g., 50 cm or shorter), but often does not mean that the two corresponding elements directly touch each other (i.e., the aforementioned distance (spacing) between them is reduced to 0).

In some embodiments, the detection device 100 further includes an RF (Radio Frequency) module (not shown). The RF module is respectively coupled to the reception antenna 130 and the transmission antenna 140. For example, the transmission antenna 140 may be excited by the RF module, and the RF module may be further configured to process the signals received by the reception antenna 130.

Generally, when the detection device 100 needs to detect the object 190 under test, it may be operated as follows. In the beginning, the transmission antenna 140 transmits a first wireless signal S1 toward the object 190 under test. In response, a second wireless signal S2 is transmitted back via the object 190. The second wireless signal S2 may include the relative information of the object 190, such as a vital sign or a displacement. Next, the reflector 150 generates a third wireless signal S3 by reflecting the second wireless signal S2. Finally, the reception antenna 130 receives the third wireless signal S3 from the reflector 150. In some embodiments, the detection device 100 may obtain a variety of relative information of the object 190, such as the physiological information and/or the displacement of the object 190, by analyzing the third wireless signal S3.

According to practical measurements, if the reception antenna 130 and the transmission antenna 140 are disposed on different surfaces of the dielectric substrate 110, the isolation between the reception antenna 130 and the transmission antenna 140 may be further enhanced. In addition, the incorporation of the reflector 150 may help to increase the directivity of the reception antenna 130 and also to prevent the surrounding noise from accidentally entering the detection device 100. With such a design, the detection device 100 of the invention may provide good FOV (Field of View), thereby effectively improving the detection quality thereof.

In some embodiments, the detection device 100 is applied to ward care, and the object 190 under test is a bedridden patient. By using the reception antenna 130 and the corresponding reflector 150, the physiological state of the patient may be completely monitored by the detection device 100. It may significantly improve the safety and convenience of long-term care.

The following embodiments will introduce different configurations and detail structural features of the detection device 100. It should be understood that these figures and descriptions are merely exemplary, rather than limitations of the invention.

Figure 2:
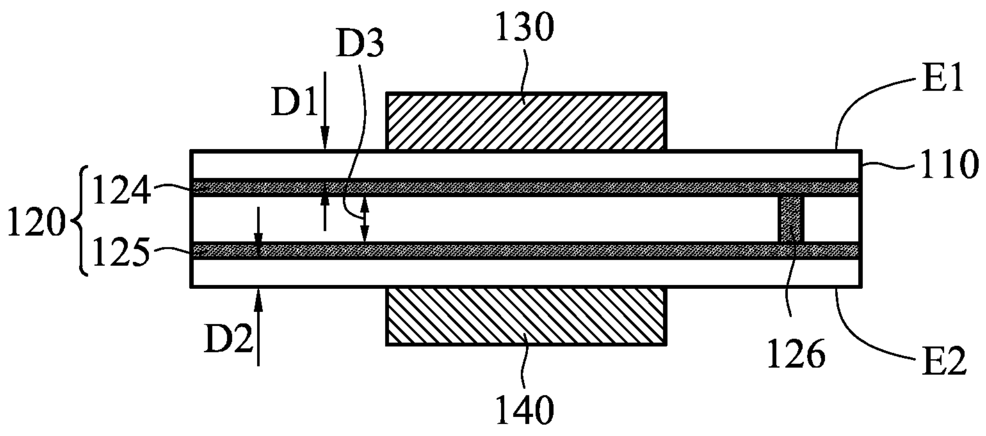
FIG. 2 is a partial sectional view of a detection device according to an embodiment of the invention.

FIG. 2 is a partial sectional view of the detection device 100 according to an embodiment of the invention. In order to simplify the figure, the aforementioned reflector is not displayed in FIG. 2. In the embodiment of FIG. 2, the ground element 120 of the dielectric substrate 110 includes a first ground plane 124 and a second ground plane 125, and the second ground plane 125 is parallel to the first ground plane 124. It should be noted that both the first ground plane 124 and the second ground plane 125 are embedded in the dielectric substrate 110. Also, both the first ground plane 124 and the second ground plane 125 are positioned between the first surface E1 and the second surface E2 of the dielectric substrate 110. According to practical measurements, such a design of dual ground planes may help to further enhance the aforementioned antenna isolation.

In some embodiments, the first ground plane 124 and the second ground plane 125 are coupled to each other. For example, the detection device 100 may further include a conductive via element 126 embedded in the dielectric substrate 110. The second ground plane 125 may be further coupled through the conductive via element 126 to the first ground plane 124. However, the invention is not limited thereto. In some embodiments, the connection portion between the first ground plane 124 and the second ground plane 125 is positioned outside the dielectric substrate 110, and the aforementioned conductive via element 126 is omitted.

In some embodiments, the element sizes and element parameters of the detection device 100 will be described as follows. The dielectric constant of the dielectric substrate 110 may be from 2 to 5. The length L1 of the reception antenna 130 may be substantially equal to 0.25 wavelength (λ/4) of the operational frequency band of the detection device 100. The width W1 of the reception antenna 130 may be substantially equal to 0.25 wavelength (λ/4) of the operational frequency band of the detection device 100. The length L2 of the transmission antenna 140 may be substantially equal to 0.25 wavelength (λ/4) of the operational frequency band of the detection device 100. The width W2 of the transmission antenna 140 may be substantially equal to 0.25 wavelength (λ/4) of the operational frequency band of the detection device 100. There is a first distance D1 between the reception antenna 130 and the first ground plane 124. The first distance D1 may be from 0.1 mm to 1.6 mm. There is a second distance D2 between the transmission antenna 140 and the second ground plane 125. The second distance D2 may be from 0.1 mm to 1.6 mm. There is a third distance D3 between the first ground plane 124 and the second ground plane 125. The third distance D3 may be from 0.01 mm to 5 mm. The ranges of the above element sizes and element parameters are determined according to many experiment results, and they may help to maximize the antenna isolation of the detection device 100, and to optimize the operational bandwidth and the impedance matching of the reception antenna 130 and the transmission antenna 140.

Figure 3:
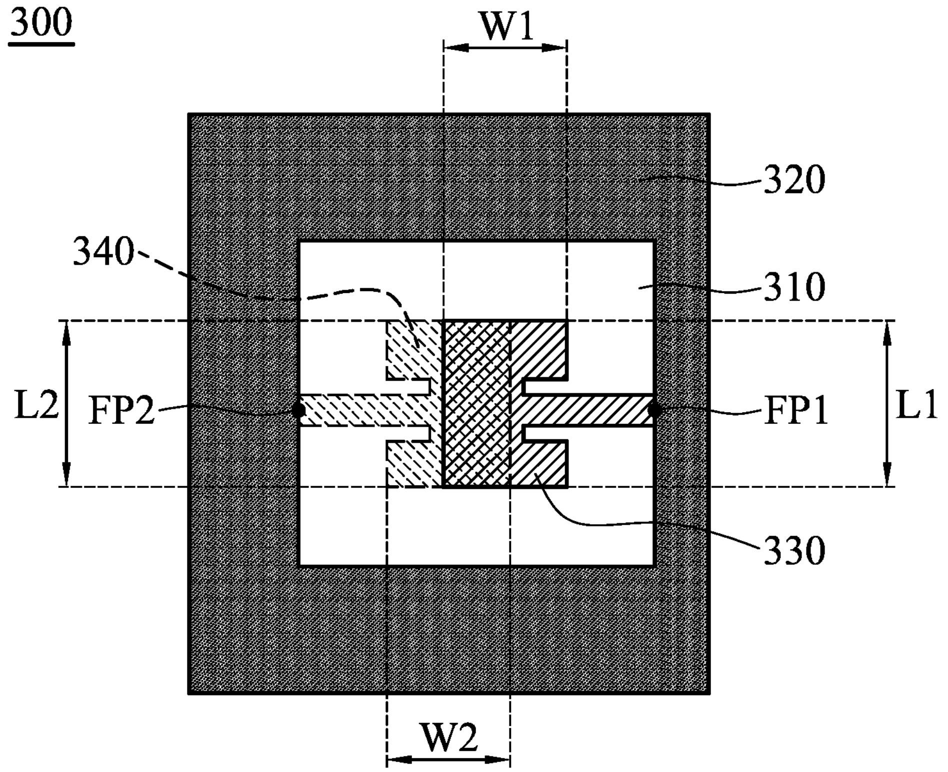
FIG. 3 is a partial top view of a detection device according to an embodiment of the invention.

FIG. 3 is a partial top view of a detection device 300 according to an embodiment of the invention. In order to simplify the figure, the aforementioned reflector is not displayed in FIG. 3. FIG. 3 is similar to FIG. 1. In the embodiment of FIG. 3, the detection device 300 includes a dielectric substrate 310, a reception antenna 330, a transmission antenna 340, and a reflector (not shown). The dielectric substrate 310 includes a ground element 320, which may extend beyond the body of the dielectric substrate 310. Furthermore, the size of the ground element 320 may be the same as the outer frame size of the dielectric substrate 310. Also, the size of the ground element 320 may be the same as the size of the first ground plane 124 and the size of the second ground plane 125 of FIG. 2 Similarly, the reception antenna 330 may be disposed on the first surface of the dielectric substrate 310, and the transmission antenna 340 may be disposed on the opposite second surface of the dielectric substrate 310. That is, the aforementioned first surface and second surface are respectively disposed in opposite directions, and the reception antenna 330 and the transmission antenna 340 are also respectively disposed in opposite directions. The ground element 320 may be disposed between the reception antenna 330 and the transmission antenna 340.

Specifically, the reception antenna 330 may be a patch antenna with a first feeding point FP1, and the transmission antenna 340 may be another patch antenna with a second feeding point FP2. The reception antenna 330 and the transmission antenna 340 may have symmetrical patterns. For example, each of the reception antenna 330 and the transmission antenna 340 may substantially have a square shape. The vertical projection of the reception antenna 330 may at least partially overlap the transmission antenna 340, but it is not limited thereto. Other features of the detection device 300 of FIG. 3 are similar to those of the detection device 100 of FIG. 1 and FIG. 2. Accordingly, these embodiments may achieve similar levels of performance.

Figure 4:
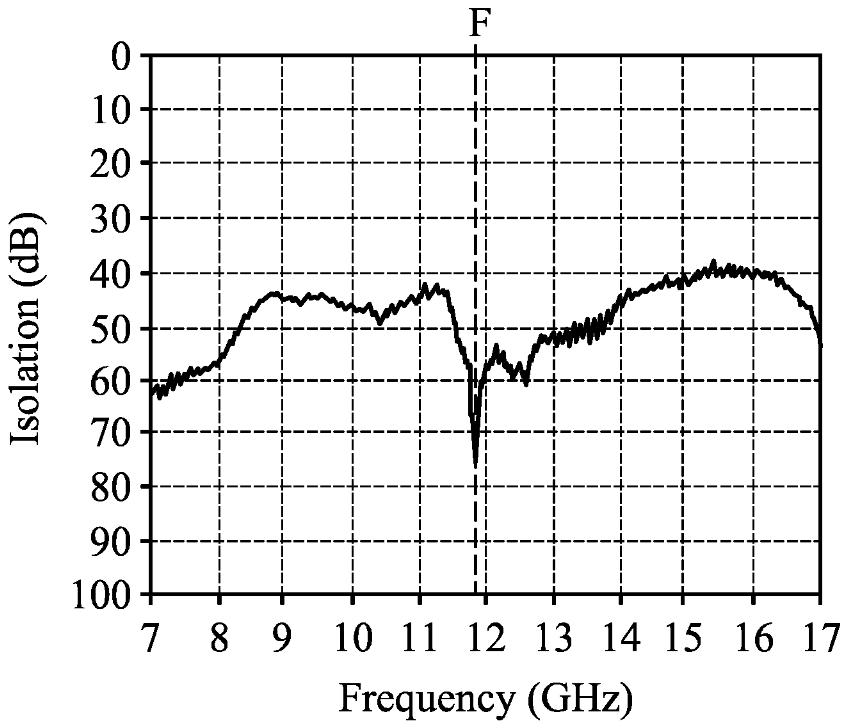
FIG. 4 is a diagram of isolation between a reception antenna and a transmission antenna of a detection device according to an embodiment of the invention.

FIG. 4 is a diagram of the isolation between the reception antenna 330 and the transmission antenna 340 of the detection device 300 according to an embodiment of the invention. The horizontal axis represents the operational frequency (GHz), and the vertical axis represents the isolation (dB). For example, if the first feeding point FP1 is set as a first port (Port 1) and the second feeding point FP2 is set as a second port (Port 2), the absolute value of the S21 parameter between the first port and the second port may be considered as the isolation between the reception antenna 330 and the transmission antenna 340. According to the measurement of FIG. 4, the isolation of the detection device 300 may reach 75 dB or higher at a central frequency F of both the reception antenna 330 and the transmission antenna 340.

Figure 5:
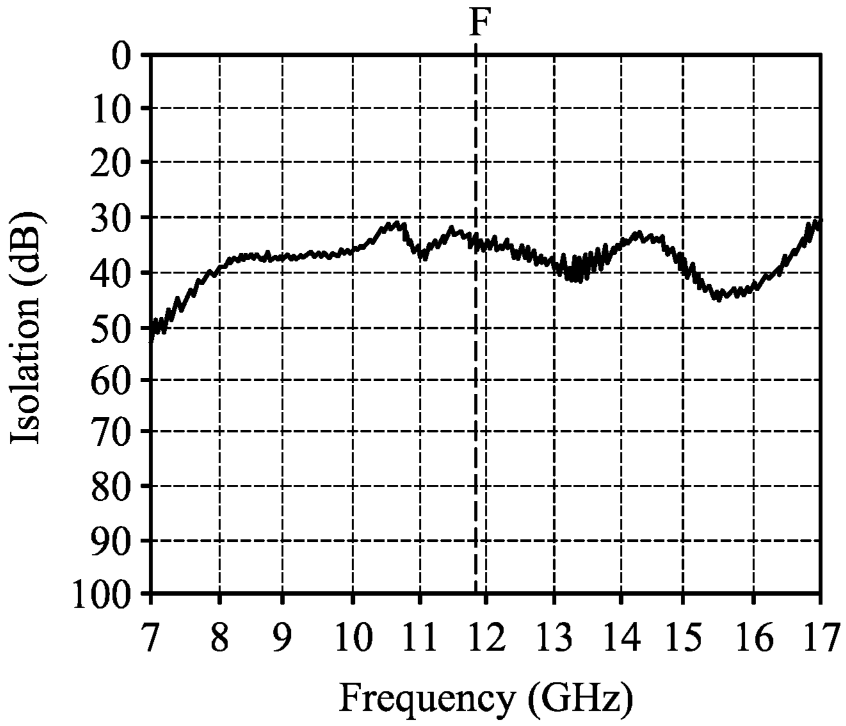
FIG. 5 is a diagram of isolation between a reception antenna and a transmission antenna of a conventional detection device.

FIG. 5 is a diagram of the isolation between a reception antenna and a transmission antenna of a conventional detection device. The horizontal axis represents the operational frequency (GHz), and the vertical axis represents the isolation (dB). According to the measurement of FIG. 5, if the proposed design of the invention is not applied, the isolation between the reception antenna and the transmission antenna may be merely about 30 dB. That is, there may be serious mutual interference between the reception antenna and the transmission antenna of the conventional detection device. In other words, the proposed design of the detection device 300 (or 100) of the invention may improve the antenna isolation by at least 40 dB.

Figure 6:
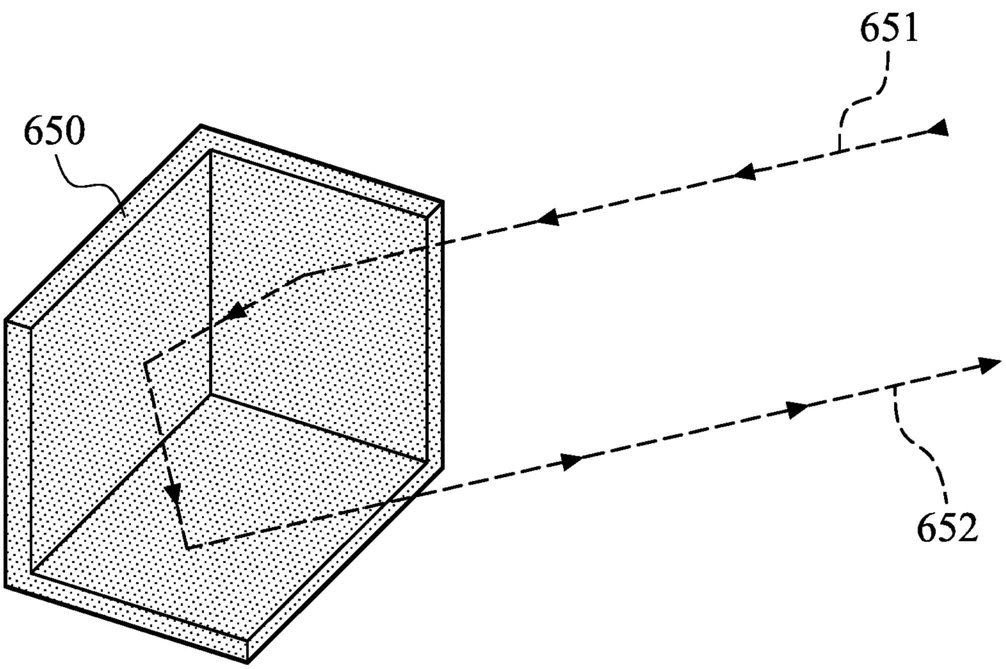
FIG. 6 is a perspective view of a reflector according to an embodiment of the invention.

FIG. 6 is a perspective view of a reflector 650 according to an embodiment of the invention. In the embodiment of FIG. 6, the reflector 650 is a corner reflector which includes three orthogonal metal planes. For example, if a wireless signal is transmitted to the reflector 650 along a first direction 651, the reflector 650 may reflect the wireless signal along a second direction 652, and the second direction 652 may be exactly opposite to the first direction 651. It should be understood that the reflector 650 of FIG. 6 may be applied to the above detection devices 100 and 300 for similar performance.

Figure 7:
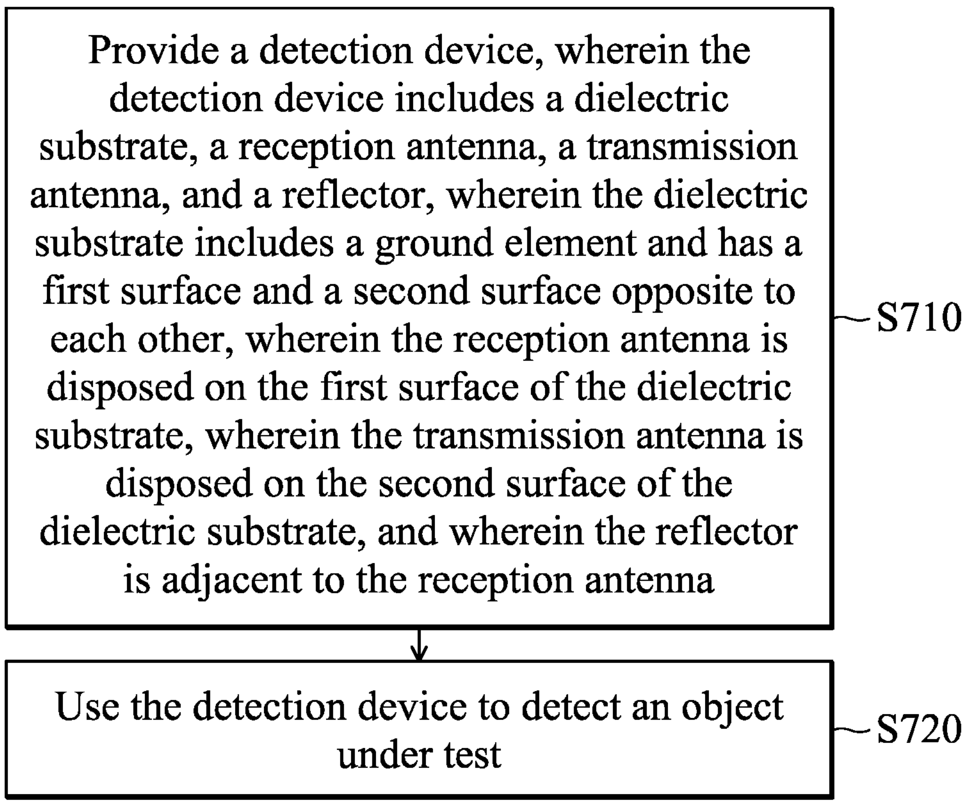
FIG. 7 is a flowchart of a detection method according to an embodiment of the invention.

FIG. 7 is a flowchart of a detection method according to an embodiment of the invention. In the step S710, a detection device is provided. The detection device includes a dielectric substrate, a reception antenna, a transmission antenna, and a reflector. The dielectric substrate includes a ground element and has a first surface and a second surface which are opposite to each other. The reception antenna is disposed on the first surface of the dielectric substrate. The transmission antenna is disposed on the second surface of the dielectric substrate. The reflector is adjacent to the reception antenna. In the step S720, the detection device is used to detect an object under test. It should be understood that these steps are not required to be performed in order, and every feature of the embodiments of FIGS. 1 to 6 may be applied to the detection method of FIG. 7.

Figure 8:
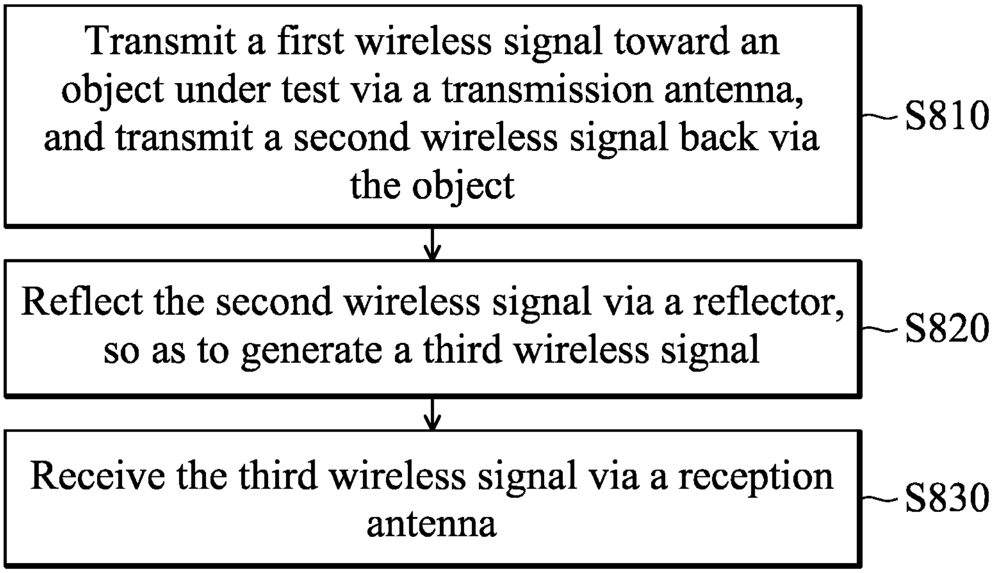
FIG. 8 is a flowchart of a detection method according to an embodiment of the invention.

FIG. 8 is a flowchart of a detection method according to an embodiment of the invention. In step S810, a first wireless signal is transmitted toward an object under test by a transmission antenna, and a second wireless signal is transmitted back by the object. In step S820, the second wireless signal is reflected by a reflector, so as to generate a third wireless signal. In step S830, the third wireless signal is received by a reception antenna. It should be understood that these steps are not required to be performed in order, and every feature of the embodiments of FIGS. 1 to 7 may be applied to the detection method of FIG. 8.

The invention proposes a detection device and a detection method of a radar antenna. In comparison to the conventional design, the invention has at least the advantages of increasing the isolation and reducing the surrounding interference. Therefore, the invention is suitable for application in a variety of devices.

Note that the above element parameters are not limitations of the invention. A designer may fine-tune these setting values according to different requirements. It should be understood that the detection device and detection method of the invention are not limited to the configurations of FIGS. 1-8. The invention may include any one or more features of any one or more embodiments of FIGS. 1-8. In other words, not all of the features displayed in the figures should be implemented in the detection device and detection method of the invention.

The method of the invention, or certain aspects or portions thereof, may take the form of program code (i.e., executable instructions) embodied in tangible media, such as floppy diskettes, CD-ROMS, hard drives, or any other machine-readable storage medium, wherein, when the program code is loaded into and executed by a machine such as a computer, the machine thereby becomes an apparatus for practicing the methods. The methods may also be embodied in the form of program code transmitted over some transmission medium, such as electrical wiring or cabling, through fiber optics, or via any other form of transmission, wherein, when the program code is received and loaded into and executed by a machine such as a computer, the machine becomes an apparatus for practicing the disclosed methods. When implemented on a general-purpose processor, the program code combines with the processor to provide a unique apparatus that operates analogously to application-specific logic circuits.

Use of ordinal terms such as “first”, “second”, “third”, etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

It will be apparent to those skilled in the art that various modifications and variations may be made in the invention. It is intended that the standard and examples be considered as exemplary only, with a true scope of the disclosed embodiments being indicated by the following claims and their equivalents.

What is claimed is:

1. A detection device, comprising:
- a dielectric substrate, comprising a ground element, wherein the dielectric substrate has a first surface and a second surface opposite to each other;
- a reception antenna, disposed on the first surface of the dielectric substrate;
- a transmission antenna, disposed on the second surface of the dielectric substrate; and
- a reflector, wherein the reflector is adjacent to the reception antenna;
- wherein the ground element is disposed between the reception antenna and the transmission antenna.

2. The detection device as claimed in claim 1, wherein the transmission antenna transmits a first wireless signal, and a second wireless signal is transmitted back by an object under test.

3. The detection device as claimed in claim 2, wherein the reflector generates a third wireless signal by reflecting the second wireless signal, and the reception antenna receives the third wireless signal.

4. The detection device as claimed in claim 1, wherein the ground element is embedded in the dielectric substrate, and the ground element is positioned between the first surface and the second surface of the dielectric substrate.

5. The detection device as claimed in claim 1, wherein the ground element comprises a first ground plane and a second ground plane coupled to each other, and the second ground plane is parallel to the first ground plane.

6. The detection device as claimed in claim 1, wherein the reception antenna is a patch antenna, and the transmission antenna is another patch antenna.

7. The detection device as claimed in claim 1, wherein the reflector is a parabolic dish reflector.

8. The detection device as claimed in claim 7, wherein the reception antenna is disposed at a focal point of the parabolic dish reflector.

9. The detection device as claimed in claim 1, wherein the reflector is a corner reflector.

10. The detection device as claimed in claim 1, wherein both the reception antenna and the transmission antenna cover an operational frequency band from 5 GHz to 78 GHz.

11. A detection method, comprising the steps of:
- providing a detection device, wherein the detection device comprises a dielectric substrate, a reception antenna, a transmission antenna, and a reflector, wherein the dielectric substrate comprises a ground element and has a first surface and a second surface opposite to each other, the reception antenna is disposed on the first surface of the dielectric substrate, the transmission antenna is disposed on the second surface of the dielectric substrate, and the reflector is adjacent to the reception antenna; and
- using the detection device to detect an object under test;
- wherein the ground element is disposed between the reception antenna and the transmission antenna.

12. The detection method as claimed in claim 11, further comprising:
- transmitting a first wireless signal via the transmission antenna, and transmitting a second wireless signal back via the object.

13. The detection method as claimed in claim 12, further comprising:
- reflecting the second wireless signal via the reflector, so as to generate a third wireless signal; and
- receiving the third wireless signal via the reception antenna.

14. The detection method as claimed in claim 11, wherein the ground element is embedded in the dielectric substrate, and the ground element is positioned between the first surface and the second surface of the dielectric substrate.

15. The detection method as claimed in claim 11, wherein the ground element comprises a first ground plane and a second ground plane coupled to each other, and the second ground plane is parallel to the first ground plane.

16. The detection method as claimed in claim 11, wherein the reception antenna is a patch antenna, and the transmission antenna is another patch antenna.

17. The detection method as claimed in claim 11, wherein the reflector is a parabolic dish reflector.

18. The detection method as claimed in claim 17, wherein the reception antenna is disposed at a focal point of the parabolic dish reflector.

19. The detection method as claimed in claim 11, wherein the reflector is a corner reflector.

20. The detection method as claimed in claim 11, wherein both the reception antenna and the transmission antenna cover an operational frequency band from 5 GHz to 78 GHz.

* * * * *